US011451378B2

(12) United States Patent
Baratte et al.

(10) Patent No.: US 11,451,378 B2
(45) Date of Patent: Sep. 20, 2022

(54) DEVICE AND METHOD FOR ENCRYPTION

(71) Applicant: STMicroelectronics SA, Montrouge (FR)

(72) Inventors: Benjamin Baratte, Montrouge (FR); Laurent Halajko, Palaiseau (FR)

(73) Assignee: STMICROELECTRONICS SA, Montrouge (FR)

( * ) Notice: Subject to any disclaimer, the term of this patent is extended or adjusted under 35 U.S.C. 154(b) by 65 days.

(21) Appl. No.: 17/024,501

(22) Filed: Sep. 17, 2020

(65) Prior Publication Data
US 2021/0099291 A1  Apr. 1, 2021

(30) Foreign Application Priority Data
Sep. 30, 2019 (FR) ..................... 1910785

(51) Int. Cl.
H04L 9/08 (2006.01)
H04L 9/14 (2006.01)

(52) U.S. Cl.
CPC .......... H04L 9/0825 (2013.01); H04L 9/0822 (2013.01); H04L 9/0841 (2013.01); H04L 9/0894 (2013.01); H04L 9/14 (2013.01)

(58) Field of Classification Search
CPC ... H04L 9/0822; H04L 9/0894; H04L 9/0825; H04L 9/14; H04L 9/088; H04L 9/0841
See application file for complete search history.

(56) References Cited

U.S. PATENT DOCUMENTS

| 9,367,697 | B1* | 6/2016 | Roth ................... H04L 63/1416 |
| 10,003,467 | B1* | 6/2018 | Miller ................... H04L 9/0891 |
| 2005/0135613 | A1* | 6/2005 | Brandenburg .......... G06F 21/10 380/43 |
| 2014/0082358 | A1* | 3/2014 | Nakhjiri ................ H04W 12/04 713/168 |
| 2019/0109869 | A1* | 4/2019 | Bailey ................. H04L 63/1416 |
| 2020/0004983 | A1* | 1/2020 | Chen ................... H04L 63/0428 |

FOREIGN PATENT DOCUMENTS

EP  3291481 A1  3/2018

OTHER PUBLICATIONS

Menezes, A., et al, "Chapter 13: Key Management Techniques," Handbook of Applied Cryptography; CRC Press, XP01525013, 49 pages, Oct. 1, 1996.
Menezes, A., et al,"Chapter 11—Digital Signatures," Handbook of Applied Cryptography, XP055037114, 65 pages, Jan. 1, 1997.

* cited by examiner

Primary Examiner — Mohammad A Siddiqi
(74) Attorney, Agent, or Firm — Slater Matsil, LLP

(57) ABSTRACT

An embodiment encryption method, implemented by an electronic circuit including a first non-volatile memory, comprises the creation of one or more first pairs of asymmetrical keys, the first pair or each of the first pairs comprising first private and public keys, and, for the or at least one of the first pairs, storing the first public key in the first memory, receiving a second public key during a communication session, and forming a first symmetrical key from the first private key and the second public key, the first public key staying stored in the first memory after the communication session.

22 Claims, 4 Drawing Sheets

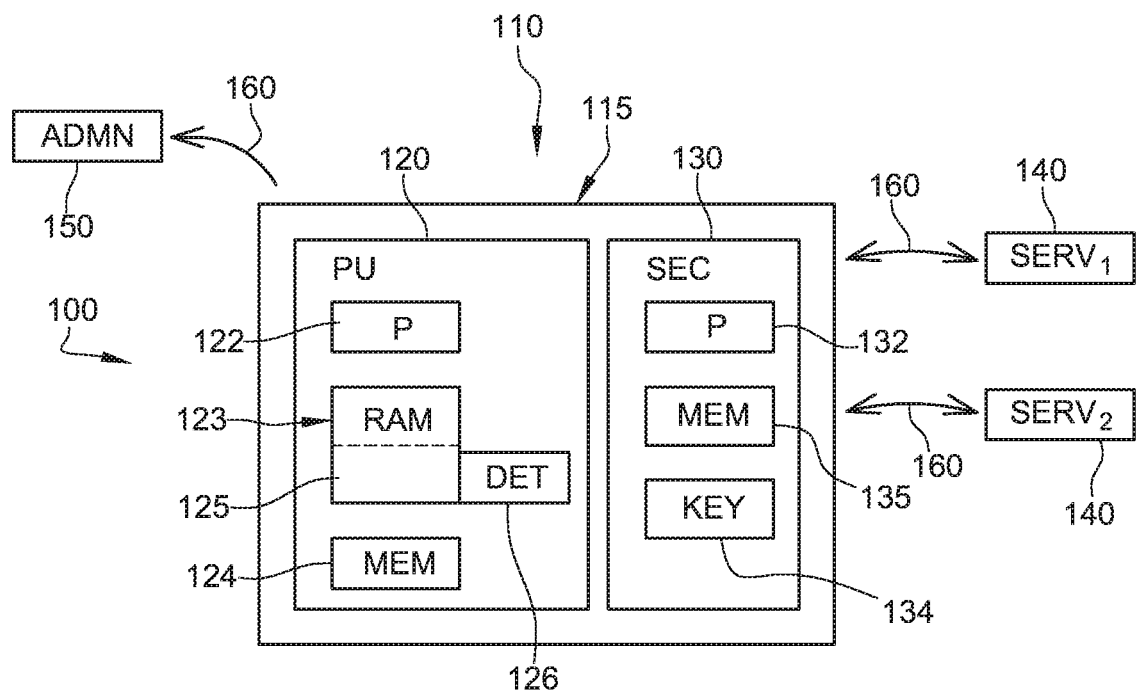

DEVICE AND METHOD FOR ENCRYPTION

CROSS-REFERENCE TO RELATED APPLICATIONS

This application claims the benefit of French Application No. 1910785, filed on Sep. 30, 2019, which application is hereby incorporated herein by reference.

TECHNICAL FIELD

The present disclosure relates generally to electronic devices and communications between electronic devices, and more specifically to the sending, processing and/or storage of encrypted data.

BACKGROUND

Certain applications relate to the sending, processing and/or storage of confidential data. The confidential data are sent and stored in encrypted form in order to prevent a person not authorized by the owner of these data from accessing these data and/or being able to alter them.

SUMMARY

One embodiment addresses all or some of the drawbacks of known methods for communicating and/or processing and/or storing confidential data.

One embodiment addresses all or some of the drawbacks of known systems for communicating and/or processing and/or storing confidential data. In particular, one embodiment addresses all or some of the drawbacks of known electronic circuits used in such a communication system for communicating and/or processing and/or storing the confidential data.

One embodiment provides an encryption method implemented by an electronic circuit including a first non-volatile memory, comprising the creation of one or more first pairs of asymmetrical keys, the first pair or each of the first pairs comprising first private and public keys; and, for the or at least one of the first pairs, storing the first public key in the first memory; receiving a second public key during a communication session; and forming a first symmetrical key from the first private key and the second public key, the first public key staying stored in the first memory after the communication session.

According to one embodiment, the method comprises, for the or at least one of the first pairs, erasing the first private key, preferably during the communication session.

According to one embodiment, for the or at least one of the first pairs, at least one second symmetrical key is formed from the first private key and the second public key.

According to one embodiment, the method comprises, for the or at least one of the first pairs, forming first and second symmetrical keys from a seed formed from the first private key and the second public key.

According to one embodiment, the method comprises, for a single one of the first pairs, storing, in the first memory, the seed and the first symmetrical key, preferably encrypted by a key internal to the electronic circuit.

According to one embodiment, the method comprises storing the first symmetrical key(s) in another memory, which is volatile and/or configured to be erased if an attack is detected.

According to one embodiment, the method comprises, for the or at least one of the first pairs, the storage of encrypted data by the first symmetrical key, the data being stored in a second nonvolatile memory.

According to one embodiment, communications internal to the electronic circuit are encrypted by an additional symmetrical key.

According to one embodiment, the additional symmetrical key is stored in the first memory in encrypted form by the first key of the or one of the first pairs.

According to one embodiment, the method comprises the first public key(s) are stored in signed form by the electronic circuit.

According to one embodiment, for the or at least one of the first pairs, the second public key comes from a second pair of asymmetrical keys comprising a second private key, the first and second pairs of asymmetrical keys being such that the first symmetrical key can be deduced from the second private key and the first public key, the first and second pairs preferably being obtained by a Diffie-Hellman algorithm.

According to one embodiment, the first memory is readable only by a holder of the additional symmetrical key and/or an administrator, preferably having a third private key.

Another embodiment provides an electronic circuit configured to implement a method as defined hereinabove.

According to one embodiment, the method further comprises, for at least one of the first pairs, the reading, by the administrator, of the first public key of the first pair; the sending of the first public key of the first pair to a holder of the second private key; and the deducing of the first symmetrical key from the first public key and the second private key.

Another embodiment provides a system comprising a circuit as defined hereinabove, the system preferably being configured to implement a method as defined hereinabove.

BRIEF DESCRIPTION OF THE DRAWINGS

The foregoing features and advantages, as well as others, will be described in detail in the following description of specific embodiments given by way of illustration and not limitation with reference to the accompanying drawings, in which:

FIG. 1 shows, in block form and very schematically, an embodiment of a system for communicating, processing and/or storing confidential data;

FIG. 2 shows, schematically, information stored by elements of the system of FIG. 1, during the implementation of steps of an embodiment of a method for communicating, processing and/or storing confidential data;

DETAILED DESCRIPTION OF ILLUSTRATIVE EMBODIMENTS

Figure 3:
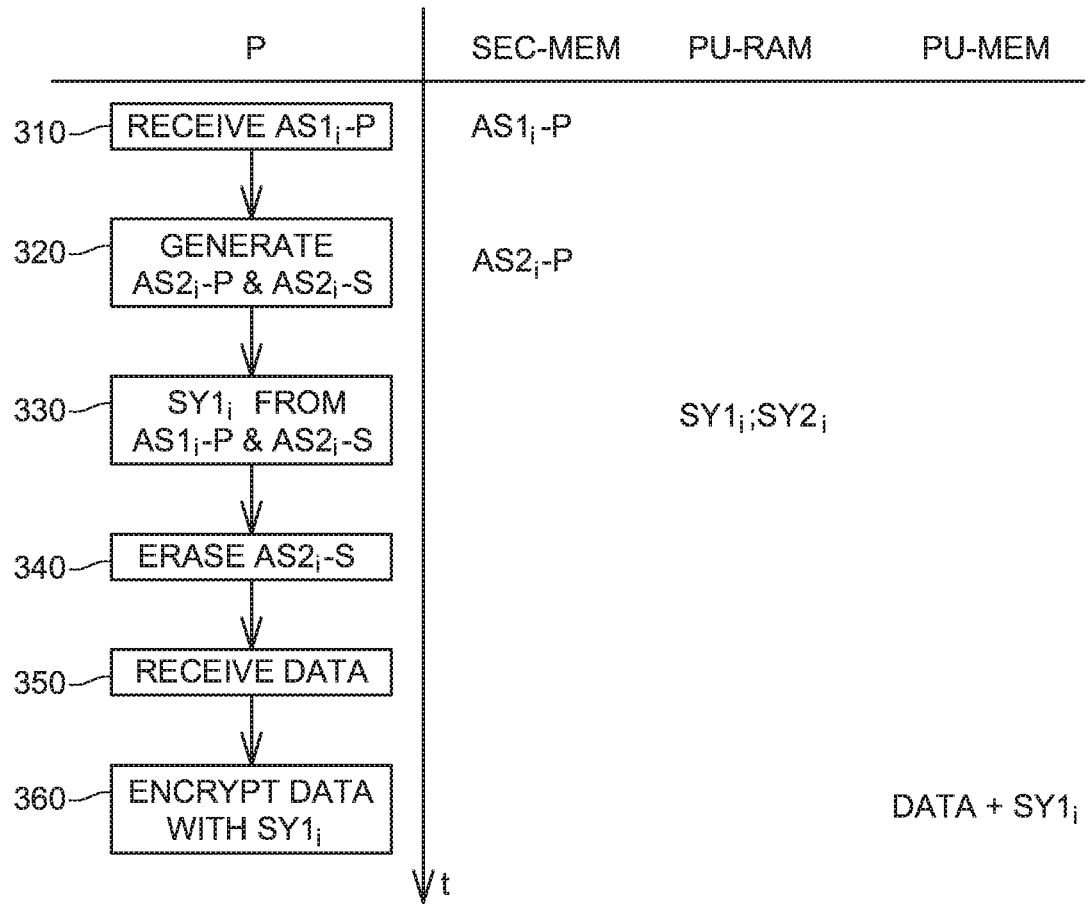
FIG. 3 shows, schematically, blocks illustrating other steps of the method, and information stored in memories during these steps.

Like features have been designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail. In particular, steps for generating keys and establishing encrypted communication sessions are not disclosed in detail, the disclosed embodiments being compatible with the usual steps for generating keys and establishing encrypted communication sessions. Furthermore, for electronic circuits, only the performed functions are described in detail, the production of these electronic circuits being within the capabilities of one skilled in the art from the described functions.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

Unless otherwise specified, the adjectives in ordinal numbers, such as "first", "second", etc., are used simply to distinguish elements relative to one another. In particular, these adjectives do not limit the disclosed devices and/or methods to a particular order of these elements.

FIG. 1 shows, in block form and very schematically, an embodiment of a system 100 for communicating, processing and/or storing confidential data.

The system 100 comprises a device 110 for acquiring and/or processing and/or storing and/or communicating confidential data. Preferably, the device 110 constitutes at least part of an object, not shown, connected to the Internet of Things (IOT). More specifically, the device 110 comprises, preferably is made up of, a set of elements coupled to one another mechanically and/or electrically by conductors. These elements comprise an electronic circuit 115. An electronic circuit refers to a set of electronic components coupled to one another preferably electrically, for example connected to one another. Preferably, the components are fixed on, and electrically coupled to, preferably connected to, a printed circuit board (PCB). The printed circuit board can be shared by a plurality of electronic components. The device 110 can further comprise sensors, preferably configured for acquiring confidential data, for example sensors for medical parameters of a patient.

The system 100 comprises one or more security domains 140, each owning confidential data. The security domains can each be defined by a server configured to store and/or process and/or communicate its confidential data with the device. Two security domains ($SERV_1$, $SERV_2$) are shown as an example, but the system may comprise any number of security domains. The system further preferably comprises an administrator 150 (ADMN). The security domains 140, the administrator 150 and the device 110 are coupled to one another by one or more local or remote communication networks 160, such as the Internet. The network(s) 160 can couple one or more security domains 140 and/or the administrator to other devices that are identical or similar to the device 110.

In one example, a security domain is defined by a server configured to store and/or process and/or communicate data from a plurality of users. Such a server can be a medical data server, each user then corresponding to a patient. In another example, compatible with the preceding example, the server is a cloud computing server, configured to store the confidential data of each user in the cloud. The device 110 can collect confidential data from users, for example medical data, and send these data to the server.

The network(s) 160 can be at least partially of the wireless network type, for example of the long-range wide area network (LoRaWAN) type, or of the type corresponding to the Bluetooth standard, preferably version v4.0 or later thereof, that is to say, low-energy Bluetooth (BLE), or of the Wi-Fi or SigFox type, etc. The communications between the security domains, the administrator and the device 110 can also be at least partially wired (for example, a connection according to the Ethernet or ADC type, or a serial connection). These communications can also be done directly, for example by a universal serial bus (USB) plug.

The security domains 140 use the same device 110 in order to store, process and/or send their confidential data. The confidential data of each of the security domains must be protected from any unauthorized access by another one of the security domains. The confidential data must further be protected against any attack seeking to procure these data without consent from the security domain.

Preferably, the administrator 150 is also one of the security domains of the device 110, that is to say, the administrative 150 has access to its own confidential data in the device 110. The confidential data of the administrator preferably comprise internal operating data of the device 110. In particular, the operating data of the device must be protected against any attack, and protected from any unauthorized access by another one of the security domains. Likewise, the confidential data of the other security domains must be protected from any unauthorized access by the administrator.

The electronic circuit 115 of the device 110 comprises a processing and data storage unit (PU) 120, comprising a data processing circuit 122 such as a microprocessor (P), and memories 123 and 124. The unit 120 preferably constitutes an electronic circuit.

The memory 123 (RAM) is preferably a random-access memory, or volatile memory, that is to say, the content of which is erased in the absence of power supply. Such an absence of supply can occur, for example, during a battery replacement of the device 110.

Preferably, at least a part 125 of the random-access memory 123 is coupled to an attack detection circuit 126 (DET). More specifically, the detection circuit 126 makes it possible to detect an attempted attack by an unauthorized person seeking to procure information stored in at least part of the processing and storage unit 120, for example in the part 125. In case of detection of an attempted attack, the part 125 of the memory is erased so that the unauthorized person is not able to procure the content of this part 125. This makes it possible to thwart the attempted attack.

The memory 124 is a rewritable non-volatile memory, that is to say, a memory of the "Flash" type. Information written in such a Flash-type memory can be erased and/or replaced. The information stored in a Flash-type memory remains stored in the absence of power supply.

The electronic circuit 115 of the device 110 comprises a security unit 130 (SEC). The security unit 130 constitutes an electronic circuit. The security unit 130 is typically comprised in an integrated circuit housing, that is to say, a block comprising pins or metallic connection zones intended to be welded or soldered to an outside device such as a printed circuit of the PCB type. The housing as a whole can be subject to a certification, preferably according to the common criteria (CC) with evaluation assurance level (EAL) 5+.

The security unit 130 typically comprises a data processing circuit 132 (P), such as a microprocessor. The data processing circuit 132 is typically specialized in the operations typically used in cryptography, such as key generation, data encryption, and/or modular exponentiation.

The security unit 130 comprises a key space 134 (KEY). The key space 134 comprises locations where keys can be written. The keys are stored in the space 134 in encrypted form and are not accessible in write mode, in particular, their decrypted form is not accessible. The security unit is configured to perform encryption/decryption operations from stored keys without providing access to the stored keys. The security unit is also, for example, configured to perform signature generation and/or verification operations.

The security unit 130 comprises a memory 135. The memory 135 is preferably of the Flash type. Preferably, the content of the memory 135 of the security unit 130 is accessible only by the administrator 150 and/or by the processing unit 120.

FIG. 2 shows, schematically, information stored by elements of the system of FIG. 1, during the implementation of steps of an embodiment of a method for acquiring and/or processing and/or storing and/or communicating confidential data. More specifically, the content is shown of a memory 210 of the administrator 150 (ADMN), the memory 135 and the key space 134 of the security unit 130 (SEC), and a memory 220 of one of the security domains 140 (SERV$_i$, i being an index associated with the considered security domain).

Preferably, the administrator 150 manages a pair of encryption keys AK1, comprising a key AK1-1 and a key AK1-2. The pair of keys AK1 can be a pair of symmetrical keys, that is to say, the keys AK1-1 and AK-2 are a same symmetrical encryption key, also called symmetrical key. The pair of keys AK1 can be a pair of a symmetrical encryption keys, also called pair of asymmetrical keys, the keys AK1-1 and AK1-2 respectively being public and private. The embodiments are compatible with any typical step for generating symmetrical or asymmetrical keys. The administrator keeps the key AK1-2. The key AK1-1 is stored in the security unit 130. Preferably, the step for generating and storing the pair of asymmetrical keys AK1 is carried out before the other disclosed steps, and in particular before the steps comprising storing information in the memory 135. In the later steps of the method, the key AK1-2 allows the content of the memory 135 to be accessed. Preferably, the content of the memory is stored in encrypted form, and the key AK1-2 allows the unencrypted content to be obtained from the encrypted form.

Each security domain 140 generates a pair of asymmetrical keys $AS1_i$. The steps for generating pairs of asymmetrical keys $AS1_i$ are carried out before or after the step for generating the pair of keys AK1. The pair $AS1_i$ comprises a public key $AS1_i$-P and a private key $AS1_i$-S. Each security domain 140 keeps its private key $AS1_i$-S.

For each security domain 140, during a communication session 240, preferably before the security domain 140 and the device 110 communicate together in a secure manner, the security domain 140 sends its public key $AS1_i$-P to the security unit 130. The public key $AS1_i$-P is stored in the memory 135. Because only public information is exchanged, the communication session 240 can be performed through any means, such as the network 160 disclosed hereinabove in relation with FIG. 1. The communication session is preferably a trusted session, that is to say, a session in which the participants have been authenticated by a trusted authority in order to exchange public information.

In particular, in the preferred case where the administrator 150 is also a security domain, the administrator (here identified by the index i=0) also generates a pair of keys $AS1_0$, comprising public $AS1_0$-P and private $AS1_0$-S keys. The public key $AS1_0$-P is sent to the security unit 130 during a communication session 230 of the type of the communication session 240. The public key $AS1_0$-P is stored in the memory 135. The private key $AS1_0$-S remains stored in the memory 210 of the administrator.

FIG. 3 shows, schematically, blocks illustrating steps of the method, and information stored in memories during these steps. More specifically, information has been shown in the memory 135 (SEC-MEM) of the security unit 130 and in the memories 123 (PU-RAM) and 124 (PU-MEM) of the processing and storage unit 120. The steps take place along a vertical time axis t, and each stored piece of information has been shown in the vertical position corresponding to the instant of storage and the horizontal position corresponding to the memory in question. The stored piece of information next stays in the memory in question. The steps described here in relation with FIG. 3 can be successive, or some of the steps can be reversed.

In a step 310 (RECEIVE $AS1_i$-P), during the communication session 240 (FIG. 2), the security unit 130 receives the public key $AS1_i$-P sent by the security domain 140 in question. The security unit 130 stores the public key $AS1_i$-P in the memory 135.

In a step 320 (GENERATE $AS2_i$-P & $AS1_i$-S), the security unit 130 generates a pair of asymmetrical keys $AS2_i$. The pair $AS2_i$ comprises a public key $AS2_i$-P and a private key $AS2_i$-S. The public key $AS2_i$-P is stored in the memory 135 of the security unit 130. The security unit 130 can send the public key $AS2_i$-P to the security domain in question. Step 310 for receiving the public key $AS1_i$-P can take place before, during or after the step 320 for generating and storing the pair of asymmetrical keys $AS2_i$. In particular, step 320 can take place before the communication session 240 (FIG. 2).

After step 320, the public key $AS2_i$-P stays stored in the memory 135. In particular, the public key $AS2_i$-P stays stored after the end of the communication session 240, and stays in the memory during any other communication sessions with the security domain in question or with another one of the security domains. More specifically, the public key $AS2_i$-P stays stored in the memory 135 after any attack seeking to procure confidential data or after any cutoff of the power supply of the device. This key $AS2_i$-P will then be able to be used in a manner disclosed hereinafter in relation with FIG. 5.

In a step 330 ($SY1_i$ FROM $AS1_i$-P & $AS2_i$-S), the security unit 130 generates a symmetrical key, $SY1_i$. The symmetrical key $SY1_i$ is generated from the private key AS2-S generated by the security unit 130 and the public key $AS1_i$-P coming from the security domain. The security unit sends the symmetrical key $SY1_i$ to the processing and storage unit 120. Preferably, the processing and storage unit 120 receives the symmetrical key $SY1_i$ and stores it, preferably in the random-access memory 123, still more preferably in the part 125 of the random-access memory 123.

Preferably, the security unit 130 further generates one or more symmetrical keys $SY2_i$ from the private key $AS2_i$-S that it has generated and the public key $AS1_i$-P coming from the security domain. One exemplary embodiment of such a step is described in detail hereinafter in relation with FIG. 4. Preferably, the processing and storage unit 120 receives the symmetrical key(s) $SY2_i$ and stores them, preferably in the random-access memory 123, still more preferably in the part 125 of the random-access memory 123.

Preferably, in a step 340 (ERASE $AS2_i$-S) after the step 330, the security unit 130 erases, that is to say, destroys, the private key $AS2_i$-S. In other words, after this step, the device no longer contains information making it possible to reconstitute the private key AS2-S.

Preferably, step 340 takes place as soon as possible after step 330, and in particular before the successive optional steps 350 and 360, more preferably before the end of the communication session 240. One thus limits the duration during which the private key AS2-S, which the symmetrical key(s) $SY1_i$, $SY2_i$ to be generated, is present in the device.

Preferably, after steps 330 and 340, at least when the security domain 140 in question is not the administrator 150, the keys which, among the symmetrical keys $SY1_i$, $SY2_i$, are stored, are only in the random-access memory 123, more preferably in the part 125 of the random-access memory 123. As a result, if an attempted attack is detected by the circuit 126, the device 110 no longer contains information making it possible by itself to find the symmetrical key(s) $SY1_i$, $SY2_i$. This makes it possible to thwart the attempted attack.

Furthermore, an operation such as maintenance, for example to change the batteries of the device 110, or an after-sale service operation, is preferably performed by triggering a detection by the detection circuit 126. Relative to a maintenance operation providing for neutralizing the detection by the circuit 126, this makes it possible to avoid creating a back door in the security of the device 110. Indeed, an attacker could have used such a back door to carry out an attack. After this operation, like after an attempted attack, the device 110 no longer contains information making it possible by itself to find the symmetrical key(s) $SY1_i$, $SY2_i$.

Preferably, in step 350 (RECEIVE DATA), the device 110, more specifically the processing and storage unit 120, acquires confidential data from the security domain in question. The confidential data can be from a sensor of the device 110, the user of the security domain coupled to the device 110, or for example the server of the security domain in question.

According to one embodiment, step 350 takes place during the communication session 240 (FIG. 2), and/or during one or more other communication sessions of the same type as the communication session 240, that is to say, by a network of the type of the network 160. More specifically, each communication session is established between the device and the server of the security domain and/or a user of the security domain. Preferably, during step 350, each communication uses one or more keys among the symmetrical keys $SY2_i$ to secure the communication and thus exchange confidential data. Thus, the steps described hereinabove allow secure communications between the device 110, the server and/or the user. The confidential data can be processed by the circuit 122 before the following step 360.

According to another embodiment, compatible with the previous one, the confidential data are acquired by the device 110, for example by sensors equipping the device. The confidential data can also be entered directly into the device, for example using a keyboard or removable storage. The confidential data can also be processed by the circuit 122 before the following step 360.

In step 360 (ENCRYPTED DATA WITH $SY_i$), the device 110 stores at least part of the confidential data. The stored confidential data are in encrypted form by the symmetrical key $SY1_i$ (DATA+$SY1_i$), that is to say, encrypted with, or using, the symmetrical key $SY1_i$. Thus, the confidential data DATA of the security domain are undecipherable without knowing the key $SY1_i$. The stored confidential data are preferably located in the Flash-type non-volatile memory 124 of the processing and storage unit 120.

As mentioned hereinabove, because the key(s) $SY1_i$, $SY2_i$ are stored in the part 125 of the random-access memory 123, if an attack and/or maintenance operation is detected, the key(s) $SY1_i$, $SY2_i$ are erased. The device then no longer stores information making it possible, by itself, to obtain the key(s) $SY1_i$, $SY2_i$. In particular, the device does not contain the private key $AS2_i$-S. Thus, if an attacker pursues an attack attempt, it will in particular no longer be able to obtain the symmetrical key $SY1_i$. Even if it succeeds, for example, in reading the content of the Flash-type memory 124, because the contained data are encrypted by the symmetrical key $SY1_i$, the attacker will not be able to decrypt this content without the key $SY1_i$. It will therefore not be able to obtain the confidential data. The steps disclosed hereinabove therefore make it possible to protect the data of the security domains against attacks.

Figure 4:
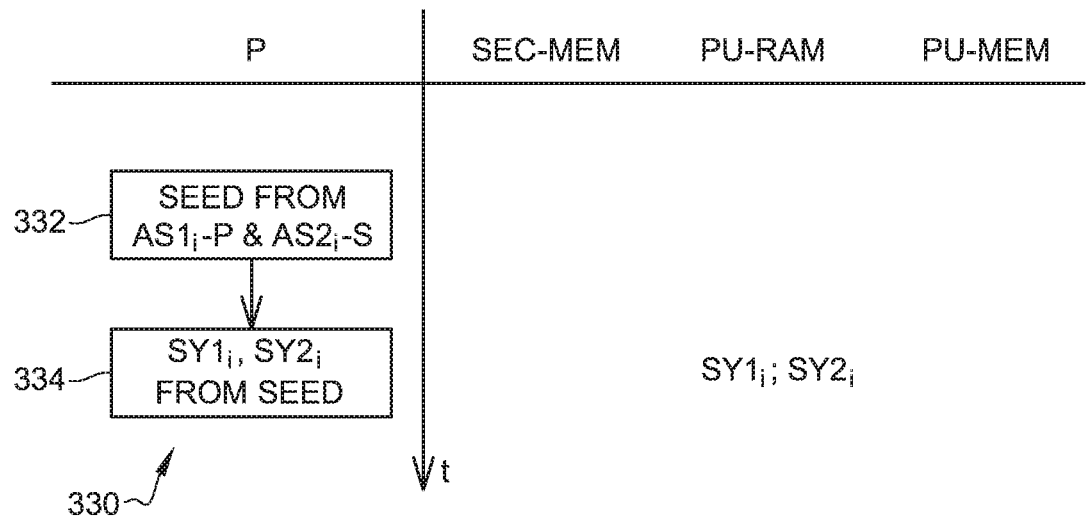
FIG. 4 shows, schematically, blocks illustrating steps of an exemplary implementation of a step of the method, and information stored in memories during this step.

FIG. 4 schematically shows blocks illustrating one preferred exemplary implementation of step 330 disclosed in relation with FIG. 3, and information stored in memories during this step. More specifically, the steps and information are shown in FIG. 4 in the same manner as in FIG. 3.

In a step 332 (SEED FROM AS1$i$-P & AS2$i$-S), the security unit 130 generates, from the private key $AS2_i$-S that it has generated and the public key $AS1_i$-P that it has received from the security domain, a seed $SEED_i$, that is to say, a number generating a pseudo-random sequence of keys. The keys $SY1_i$ and $SY2_i$ are then keys of the pseudo-random sequence.

In a step 334 ($SY1_i$, $SY2_i$ FROM SEED), each symmetrical key $SY1_i$, $SY2_i$ is obtained from the seed $SEED_i$. Preferably, each symmetrical key $SY1_i$, $SY2_i$ is generated from the seed $SEED_i$, of an integer representative of the rank of the key in question in the pseudo-random sequence, and a hash function. The hash function is then preferably of the secure hash algorithm (SHA) type, for example SHA-256. In an alternative embodiment, it is possible to implement any typical step for generating keys of a pseudo-random sequence from a seed.

According to the illustrated example, like in step 330 disclosed herein above in relation with FIG. 3, the symmetrical key $SY1_i$, and optionally one or more of the symmetrical keys $SY2_i$ are preferably stored in the random-access memory 123, still more preferably in the part 125 of the random-access memory 123. According to another example, not shown, the storage of the keys $SY1_i$, $SY2_i$ is replaced by the storage of the seed $SEED_i$. In the absence of attack and maintenance operation, the keys $SY1_i$ and $SY2_i$ can be found from the seed $SEED_i$ in the manner disclosed herein above. Preferably, the seed $SEED_i$ is stored only in the random-access memory. In still another example, the seed $SEED_i$ and the key(s) $SY1_i$ and $SY2_i$ are stored, preferably only in the random-access memory. As disclosed hereinabove, because the storage is in random-access memory, after an attack attempt, the device 110 no longer contains information making it possible, by itself, to obtain the key(s) $SY1_i$, $SY2_i$, which makes it possible to thwart the attack attempt.

Figure 5:
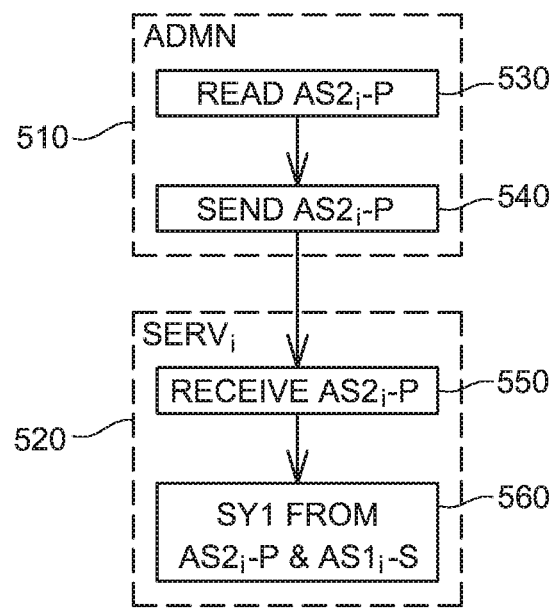
FIG. 5 shows, in block form and schematically, other steps of an example of the method.

FIG. 5 shows, in block form and schematically, other steps of an example of the method. These steps follow those of FIG. 3. More specifically, the steps executed by the administrator 150 (ADMIN) are shown in a box 510, and the steps executed by a security domain 140 ($SERV_i$) are shown in a box 520.

The steps of FIG. 5 are optionally implemented after an attack is detected by the circuit 126 (FIG. 1) and/or after an absence of power supply and/or a maintenance operation. As mentioned hereinabove, this has caused the erasure of the key(s) $SY1_i$, $SY2_i$ and/or of the seed $SEED_i$ that were stored in the part 125 of the random-access memory 123. The device therefore no longer stores information making it possible, by itself, to obtain the key(s) $SY1_i$, $SY2_i$. Thus, the data of the security domain 140, stored in the Flash-type memory 124, are not decryptable from the device 110 alone. The steps of FIG. 5 disclosed hereinabove allowed the security domain to find the key(s) $SY1_i$, $SY2_i$ and to decrypt its data.

In a step 530 (READ $AS2_i$-P), the administrator reads the key $AS2_i$-P stored in the non-volatile memory 135 of the security unit 130. As mentioned hereinabove, the administrator alone preferably has the ability to read the content of the memory 135, for example due to the fact that it alone has the private key AK1-2. The administrator can also read the content of the Flash-type memory 124 and acquire the data encrypted by the symmetrical key $SY1_i$. The administrator is then not in possession of the symmetrical key $SY1_i$, and therefore cannot access the confidential data of the security domain.

Preferably, the security unit 130 has generated a signature (not shown) prior to the storage of the key $AS2_i$-P of step 320 (FIG. 3). The key $AS2_i$-P is then stored in the memory 135 in signed form with this signature. This allows the administrator to verify that the public key $AS2_i$-P is indeed that of the device 110. One thus avoids the risk that the key read in the memory does not match the key $AS2_i$-P generated by the device 110, but is in fact another key introduced into the memory by an attacker.

The administrator and the security domain 140 in question establish a communication session, preferably secure. The embodiments are compatible with any typical secure communication session, for example of the transport layer security (TLS) type.

In a step 540 (SEND $AS2_i$-P), during the communication session 240 (FIG. 2), the security unit 150 sends the public key $AS2_i$-P to the security domain 140 in question. The administrator can further send the security domain 140 the confidential data encrypted by the symmetrical key $SY_{1i}$.

In a step 550 (RECEIVE $AS2_i$-P), the security domain 140 ($SERV_i$) receives the public key $AS2_i$-P. The security domain can also receive the confidential data encrypted by the symmetrical key $SY1_i$.

In a step 560 (SY1 FROM $AS2_i$-P & $AS1_i$-S), the security domain finds, or recalculates, the key $SY1_i$ from the public key $AS2_i$-P that it has received and its private key $AS1_i$-S. To that end, the pairs of asymmetrical keys AS1$i$ (pair generated in the step of FIG. 2), and $AS2_i$ (pair generated in step 320—FIG. 3) are provided such that the symmetrical key(s) obtained from the private key $AS2_i$-S and the public key $AS1_i$-P can be deduced from the private key $AS1_i$-S and the public key $AS2_i$-P. In other words, the symmetrical key(s) $SY1_i$, $SY2_i$ are able to be calculated from the private key $AS1_i$-S and the public key $AS2_i$-P. This can be obtained by an algorithm of the Diffie-Hellman type, chosen beforehand. This algorithm results in a secret shared by the security domain 140 and the security unit 130 of the device 110. In one example, the shared secret is the symmetrical key $SY1_i$, and the security domain thus obtains $SY1_i$ from $AS2_i$-P and $AS1_i$-S. However, preferably, the shared secret is the seed $SEED_i$ and the security domain finds the symmetrical key(s) $SY1_i$, $SY2_i$ from the seed $SEED_i$ in steps disclosed hereinafter in relation with FIG. 6.

The security domain is then in possession of the symmetrical key $SY1_i$. The security domain can therefore, in a later step, decrypt its encrypted confidential data, for example the encrypted confidential data that the administrator has sent it.

The security domain alone is in possession of the symmetrical key $SY1_i$. The security domain is therefore alone able to decrypt its confidential data. In particular, neither the administrator nor the other security domains have access to its confidential data. Thus, the method disclosed hereinabove makes it possible, by erasing the keys, to protect the confidential data from an attempted attack and thus next make it possible for each security domain to find its confidential data again after the attempted attack, without these data being able to be known by the other security domains and/or the administrator.

Figure 6:
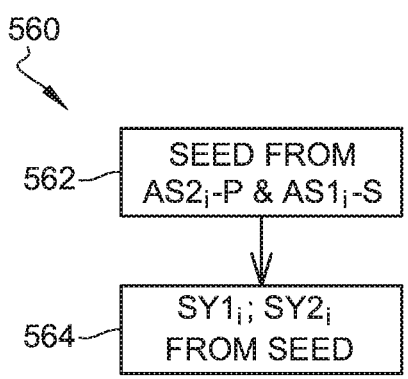
FIG. 6 shows, in block form and schematically, steps of an exemplary implementation of another one of the steps of FIG. 5.

FIG. 6 shows, in block form, steps of a preferred exemplary implementation of step 560. An algorithm of the Diffie-Hellman type is used from asymmetrical keys AS1$i$ and AS2$i$ and provides, as shared secret, the seed $SEED_i$ disclosed hereinabove in relation with FIG. 4.

In a step 562 (SEED FROM AS2$i$-P & AS1$i$-S), the security domain finds the shared secret, namely here the seed $SEED_i$, from the public key $AS2_i$-P and the private key $AS1_i$-S.

In a step 564, the security domain finds the symmetrical key(s) $SY1_i$, $SY2_i$ again from the seed $SEED_i$ with the same algorithm, defined beforehand, as that used by the security unit 130 in step 334 (FIG. 4).

Figure 7:
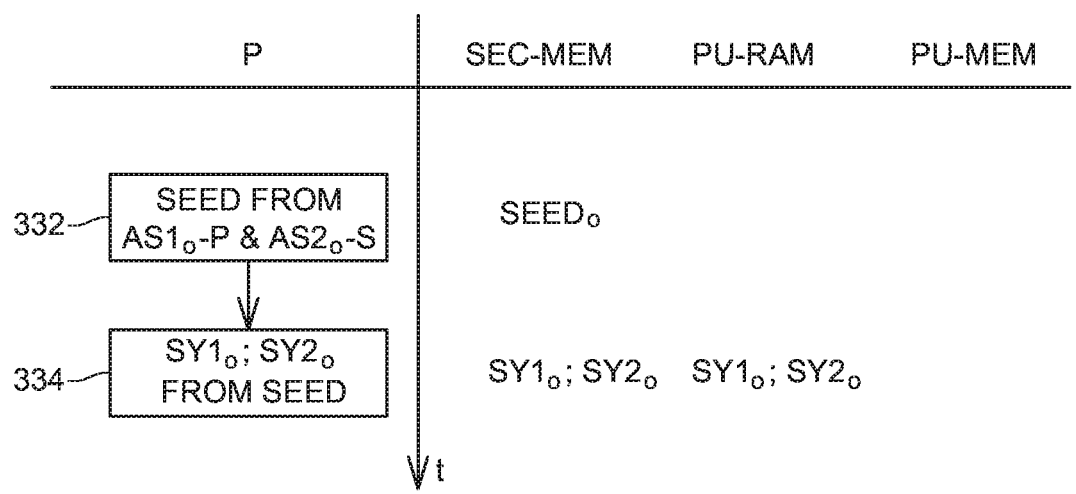
FIG. 7 shows, schematically, blocks illustrating other steps of an example of the method, and information stored in memories during these steps.

FIG. 7 shows, schematically, blocks illustrating other steps of a preferred example of the method, and information stored in memories during these steps. More specifically, the steps and stored information are shown in the same manner as in FIG. 3.

The steps of FIG. 7 correspond to step 330 of FIG. 3 in the preferred case where the administrator is also the security domain in question (identified by index i=0). More specifically, the illustrated example corresponds to the implementation of step 330 according to the steps of FIG. 4, namely comprising step 332 (SEED FROM $AS1_0$-P & $AS2_0$-S) for generating the seed $SEED_0$, and step 334 ($SY1_0$, $SY2_0$ FROM SEED) for generating the symmetrical key(s) $SY1_0$, $SY2_0$.

The steps of FIG. 7 differ from step 330 of FIG. 3 in that the symmetrical keys $SY1_0$, $SY2_0$ are stored in the memory 135 of the security element in addition to being stored in the random-access memory 123 of the processing and storage unit 120. Preferably, in the illustrated example, the steps of FIG. 7 further differ from those of FIG. 4 in that the seed $SEED_0$, and preferably, the symmetrical key(s) $SY1_0$, $SY2_0$ are stored in the memory 135 encrypted by a key of the key space 134 of the security element. The security unit to reuse the seed $SEED_0$ and/or the symmetrical key(s) $SY1_0$, $SY2_0$ in order to communicate with the administrator without making these keys accessible.

Figure 8:
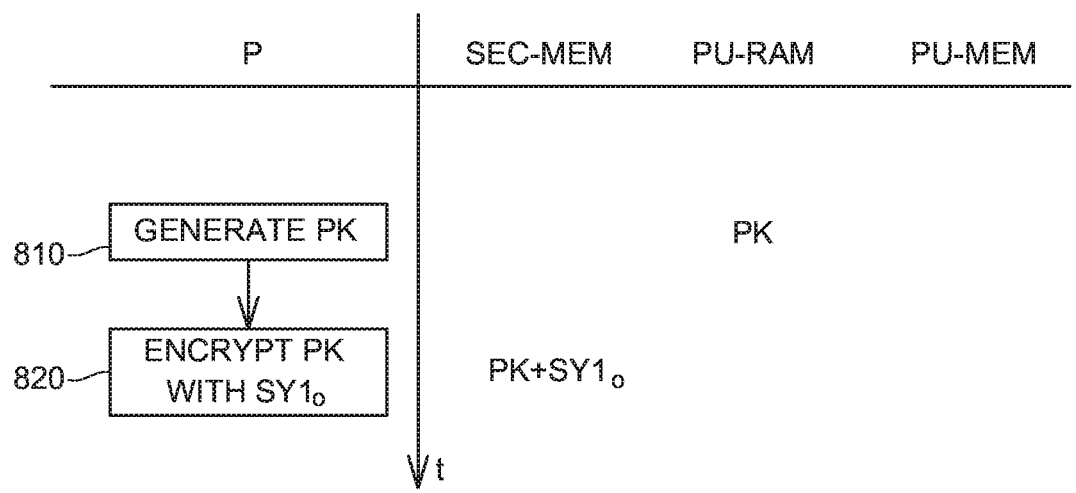
FIG. 8 shows, schematically, blocks illustrating other steps of an example of the method, and information stored in memories during these steps.

FIG. 8 shows, schematically, blocks illustrating other steps of a preferred example of the method, and information stored in memories during these steps. More specifically, the steps and stored information are shown in the same manner as in FIG. 3. The steps of FIG. 8 are preferably carried out by the device 110 before communication sessions with the security domains 140, for example before communication with the administrator 150.

In a step 810 (GENERATE PK), the security unit generates an additional symmetrical key PK. The key PK is sent to the processing and storage unit 120 and stored in the random-access memory 123, preferably in the part 125 of the random-access memory 123. The key PK is next used to encrypt the internal communications of the device, in particular between the security unit 130 and the processing and storage unit 120. One thus prevents an attacker from being able to obtain information by monitoring signals passing through links internal to the device, in particular between the units 130 and 120. One further prevents an attacker from being able to carry out an attack based on a replacement of the unit 120 with another processing and storage unit.

In a step 820 (ENCRYPT PK WITH $SY1_0$), the security unit encrypts the key PK with the symmetrical key $SY1_0$ associated with the administrator 150. The encrypted key ($PK+SY1_0$) is next stored in the memory 135 of the security unit 130. In an alternative embodiment, the key PK is encrypted by the or one of the keys $SY2_0$.

Because the key PK is stored in the random-access memory 123, this key is erased if an attack is detected and/or if the power supply is cut off. Because the only remaining copy is stored in a manner encrypted by the key $SY1_0$, and because the device does not contain any information allowing an attacker to know the key $SY1_0$ without knowing any internal key of the security element, or the private key $AS1_0$-S of the administrator, an attacker cannot know the key PK.

After an attempted attack or after a power supply cutoff, the administrator can find the key $SY1_0$ again in the manner disclosed in relation with FIGS. 5 and 6. The administrator can then decrypt and load the key PK in the part 125 of the random-access memory 123. This allows the device to be returned to an operating state. Preferably, during this new operation, the steps disclosed hereinabove are reiterated for generating pairs of keys $AS1_i$ and $AS2_i$, as well as the symmetrical key(s) $SY1_i$, $SY2_i$.

Various embodiments and variants have been described. Those skilled in the art will understand that certain features of these embodiments can be combined and other variants will readily occur to those skilled in the art.

Finally, the practical implementation of the embodiments and variants described herein is within the capabilities of those skilled in the art based on the functional description provided hereinabove.

What is claimed is:

1. An encryption method implemented by an electronic circuit including a first non-volatile memory, the method comprising:
    creating a first pair of asymmetrical keys including a first private key and a first public key;
    storing the first public key in the first non-volatile memory;
    receiving a second public key during a communication session;
    forming a first symmetrical key from the first private key and the second public key during the communication session;
    erasing the first private key after forming the first symmetrical key and before the communication session ends; and
    ending the communication session, the first public key remaining stored in the first non-volatile memory after the communication session ends.

2. The method according to claim 1, further comprising forming at least one second symmetrical key from the first private key and the second public key.

3. The method according to claim 2, further comprising forming the first and second symmetrical keys from a seed formed from the first private key and the second public key.

4. The method according to claim 3, further comprising storing, in the first non-volatile memory, the seed and the first symmetrical key.

5. The method according to claim 4, further comprising encrypting the stored seed and first symmetrical keys with an internal key internal to the electronic circuit.

6. The method according to claim 2, further comprising storing the first symmetrical key in another memory that is volatile and/or configured to be erased in response to an attack being detected.

7. The method according to claim 1, further comprising storing data, encrypted by the first symmetrical key, in a second nonvolatile memory.

8. The method according to claim 1, further comprising encrypting communications internal to the electronic circuit with an additional symmetrical key.

9. The method according to claim 8, further comprising:
    encrypting the additional symmetrical key with the first private key; and
    storing the encrypted additional symmetrical key in the first non-volatile memory.

10. The method according to claim 8, wherein the first non-volatile memory is readable only by a holder of the additional symmetrical key and/or an administrator.

11. The method according to claim 10, wherein the first non-volatile memory is readable by the administrator using a third private key.

12. The method according to claim 1, further comprising storing, by the electronic circuit, the first public key in signed form.

13. The method according to claim 1, wherein the second public key is from a second pair of asymmetrical keys comprising a second private key, and the first symmetrical key is deduce-able from the second private key and the first public key.

14. The method according to claim 13, further comprising obtaining the first and second pairs of asymmetrical keys using a Diffie-Hellman algorithm.

15. The method according to claim 13, further comprising:
    reading, by an administrator having a third private key, the first public key of the first pair of asymmetrical keys;

sending the first public key of the first pair of asymmetrical keys to a holder of the second private key; and
deducing the first symmetrical key from the first public key and the second private key.

16. An electronic circuit comprising:
a first non-volatile memory; and
a data processing circuit coupled to the first non-volatile memory, the data processing circuit configured to:
create a first pair of asymmetrical keys including a first private key and a first public key;
store the first public key in the first non-volatile memory;
receive a second public key during a communication session;
form a first symmetrical key from the first private key and the second public key during the communication session;
erase the first private key after forming the first symmetrical key and before the communication session ends; and
end the communication session, wherein the first public key remains stored in the first non-volatile memory after the communication session ends.

17. The electronic circuit according to claim 16, wherein the data processing circuit is configured to form at least one second symmetrical key from the first private key and the second public key.

18. The electronic circuit according to claim 17, wherein the data processing circuit is further configured to form the first and second symmetrical keys from a seed formed from the first private key and the second public key.

19. The electronic circuit according to claim 16, wherein the data processing circuit is configured to encrypt communications internal to the electronic circuit with an additional symmetrical key.

20. The electronic circuit according to claim 16, further comprising another memory that is volatile and/or configured to be erased in response to an attack being detected;
wherein the data processing circuit is further configured to store the first symmetrical key in the another memory.

21. The electronic circuit according to claim 16, further comprising a second nonvolatile memory;
wherein the data processing circuit is further configured to store data, encrypted by the first symmetrical key, in the second nonvolatile memory.

22. A system comprising:
an electronic circuit comprising:
a first non-volatile memory; and
a data processing circuit coupled to the first non-volatile memory, the data processing circuit configured to:
create a first pair of asymmetrical keys including a first private key and a first public key;
store the first public key in the first non-volatile memory;
receive a second public key during a communication session;
form a first symmetrical key from the first private key and the second public key, wherein the first public key remains stored in the first non-volatile memory after the communication session, wherein the second public key is from a second pair of asymmetrical keys comprising a second private key, and wherein the first symmetrical key is deduce-able from the second private key and the first public key;
reading, by an administrator having a third private key, the first public key of the first pair of asymmetrical keys;
sending the first public key of the first pair of asymmetrical keys to a holder of the second private key; and
deducing the first symmetrical key from the first public key and the second private key.

* * * * *